(12) United States Patent
Armitage et al.

(10) Patent No.: US 9,080,880 B2
(45) Date of Patent: *Jul. 14, 2015

(54) MOTION BASED MESSAGE DELIVERY

(71) Applicant: Cartasite, Inc., Denver, CO (US)

(72) Inventors: David L. Armitage, Golden, CO (US); Mark A. Mason, Thornton, CO (US)

(73) Assignee: Cartasite, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,535

(22) Filed: May 12, 2014

(65) Prior Publication Data
US 2014/0249743 A1 Sep. 4, 2014

Related U.S. Application Data

(63) Continuation of application No. 13/739,496, filed on Jan. 11, 2013, now Pat. No. 8,756,003.

(60) Provisional application No. 61/586,569, filed on Jan. 13, 2012.

(51) Int. Cl.
*G01C 21/00* (2006.01)
*G01C 21/20* (2006.01)

(52) U.S. Cl.
CPC ...................................... *G01C 21/20* (2013.01)

(58) Field of Classification Search
CPC .......................................................... G01C 1/20
USPC ........................................................... 701/409
See application file for complete search history.

(56) References Cited

U.S. PATENT DOCUMENTS

2008/0262715 A1* 10/2008 Geelen et al. ................. 701/201

* cited by examiner

*Primary Examiner* — Mary Cheung
*Assistant Examiner* — Yuen Wong
(74) *Attorney, Agent, or Firm* — Thomas A. Dougherty

(57) ABSTRACT

The present disclosure relates to motion based message delivery. A method includes receiving an information about an asset, calculating the time required for an asset to reach a safe zone, displaying the time required for an asset to reach a safe zone, displaying a communication options to communicate with a person operating the asset, and displaying a map incorporating the location of the asset, a graphical indicator of the time required to reach a safe zone, and/or a graphical indicator of communication options. Another method may include receiving a request to communicate, determining if the communication originates from, or is directed to, an asset in a safe zone, placing the communication if the asset is in the safe zone, and/or delaying the communication until the asset is in a safe zone.

17 Claims, 4 Drawing Sheets

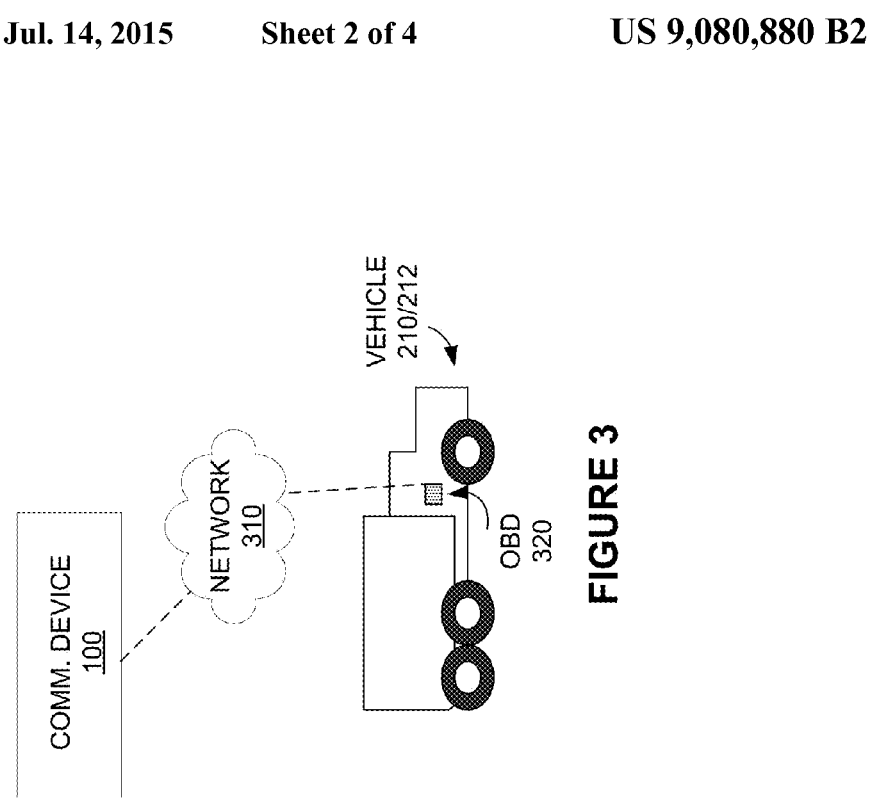
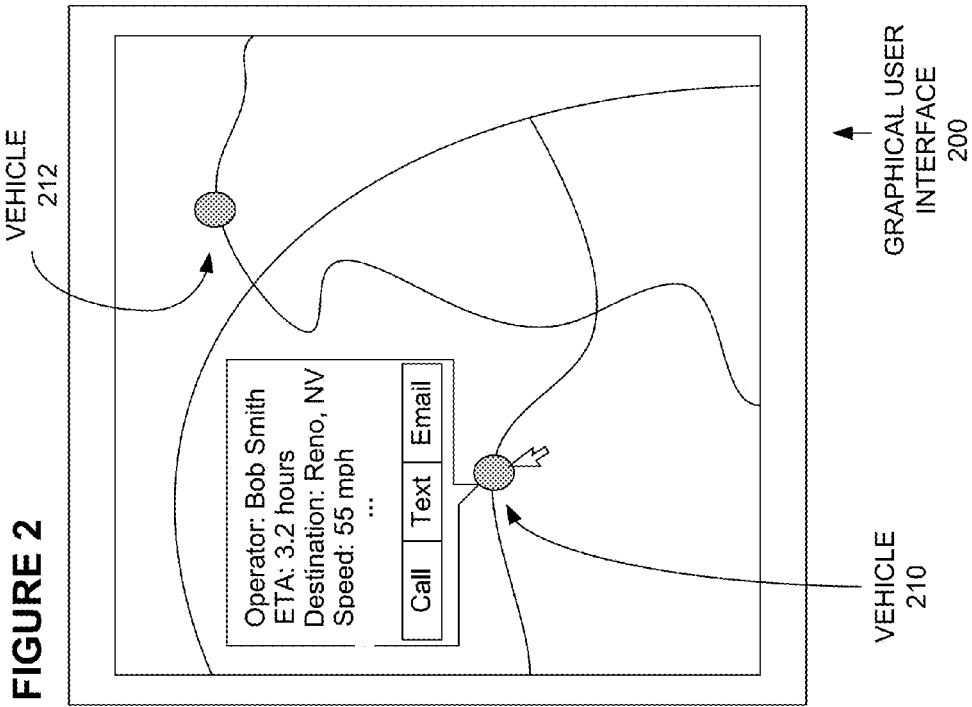

MOTION BASED MESSAGE DELIVERY

CROSS REFERENCE TO RELATED APPLICATIONS

This application is a continuation application of U.S. patent application Ser. No. 13/739,496, entitled "MOTION BASED MESSAGE DELIVERY", filed Jan. 11, 2013, which claims priority to, and benefit from, provisional patent application Ser. No. 61/586,569, entitled "MOTION BASED MESSAGE DELIVERY", filed Jan. 13, 2012, which are both incorporated by reference for all purposes.

BACKGROUND

Vehicles may use many different monitoring devices to provide information relating to driving events. Examples of information relating to driving events include vehicle speed, acceleration, braking, location, engine emissions, vehicle location, tire pressure, and others. Examples of monitoring devices could include global positioning systems, accelerometers, temperature gauges, as well as many others. As information from each monitoring device is collected, more information about driving events can be accumulated and analyzed. Additionally, the information collected may be used to assist in accident prevention, among other uses.

In particular, vehicles can be equipped with devices capable of determining when a vehicle is in motion. Vehicle motion can be determined through accelerometers, speedometers, global position systems, and other methods and systems. Information concerning whether a vehicle is in motion is useful in a number of situations including monitoring a vehicle of interest, determining whether a driver is wearing a seatbelt while the vehicle is moving, and other information.

OVERVIEW

Methods, systems, and software for motion based message delivery are provided herein, according to various examples. A method includes receiving an information about an asset, calculating the time required for an asset to reach a safe zone, displaying the time required for an asset to reach a safe zone, displaying a communication options to communicate with a person operating the asset, and displaying a map incorporating the location of the asset, a graphical indicator of the time required to reach a safe zone, and/or a graphical indicator of communication options. Another method may include receiving a request to communicate, determining if the communication originates from, or is directed to, an asset in a safe zone, sending the communication if the asset is in the safe zone, and delaying the communication until the asset is in a safe zone.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several implementations are described in connection with these drawings, the disclosure is not limited to the implementations disclosed herein. On the contrary, the intent is to cover all alternatives, modifications, and equivalents.

FIG. 2 illustrates an example graphical user interface displaying asset tracking map.

FIG. 3 illustrates communication between vehicle and communication device, according to an example.

DETAILED DESCRIPTION

Implementations described herein prevent sending or receiving of a message until a target vehicle is identified as having reached a safe zone. In particular, the operator of a vehicle is prevented from sending or receiving a message until the vehicle has stopped moving or is otherwise in a safe zone. Furthermore, an implementation includes an asset tracking map which displays information concerning whether the vehicle has reached a safe zone, the vehicle's estimated time of arrival (ETA), the vehicle's current location, and other information. Messages could include telephone calls, text messages, emails, tweets, and other communications.

Figure 1:
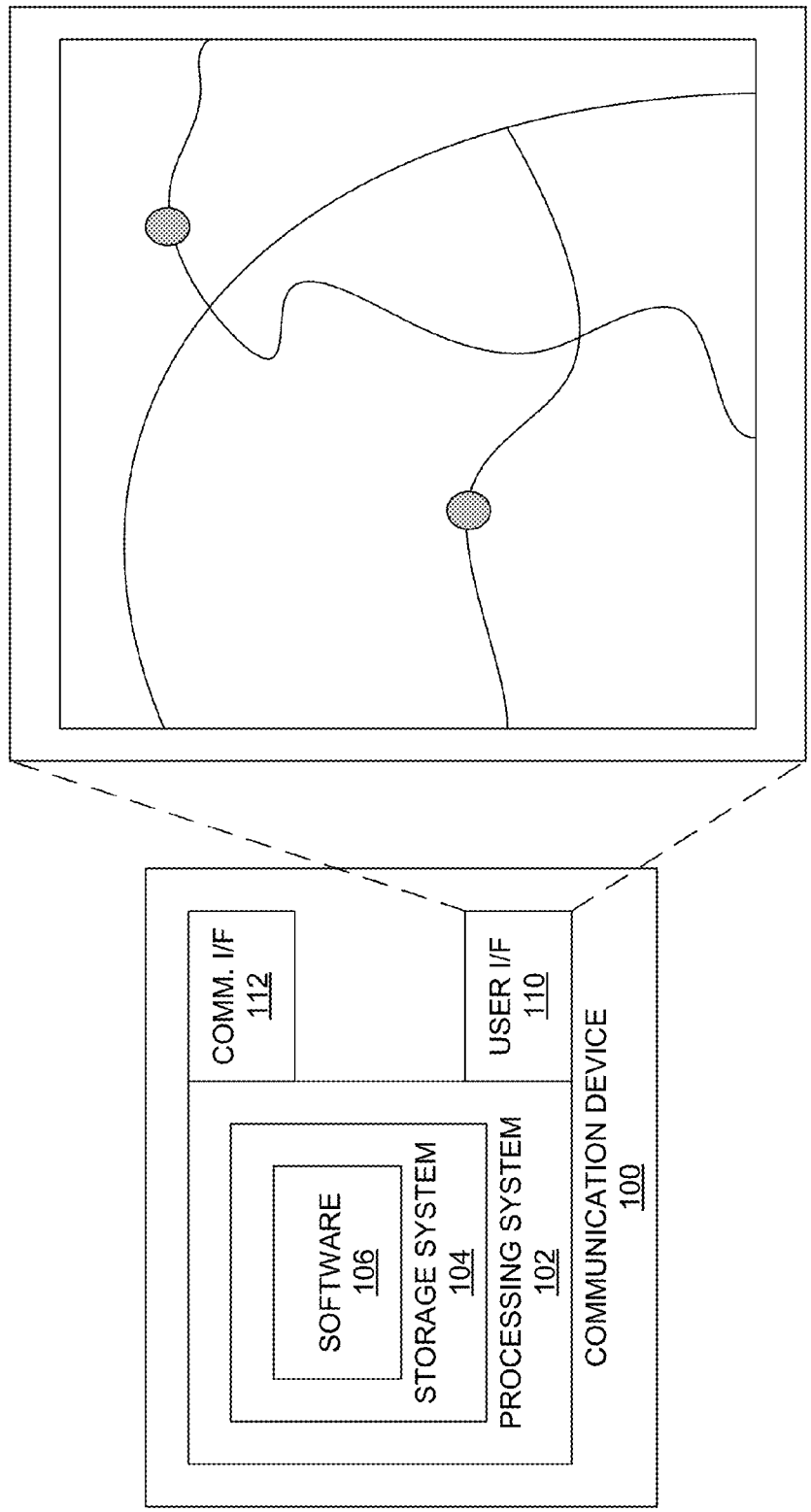
FIG. 1 illustrates communication device in an example.

FIG. 1 illustrates communication device 100. Communication device 100 includes processing system 102, storage system 104, software 106, user interface 110, and communication interface 112.

Communication device 100 includes processing system 102, storage system 104, software 106, user interface 110, and communication interface 112. Processing system 102 is linked to user interface 110 and communication interface 112. Software 106 is stored on storage system 104. In operation, processing system 102 executes software 106 to operate as disclosed herein for a communication device.

Communication interface 112 comprises a network card, network interface, port, or interface circuitry that allows communication device 100 to receive data related to vehicle motion, position, operator driving history, vehicle destination, and the like. Communication interface 112 may also include a memory device, software, processing circuitry, or some other communication device. Communication interface 112 may use various well known protocols.

User interface 110 comprises components that interact with a user to receive user inputs and to present media and/or information. User interface 110 may include a speaker, microphone, buttons, lights, display screen, mouse keyboard, or some other user input/output apparatus—including combinations thereof. For instance, FIG. 1 shows an example of user interface 100 displaying an asset tracking map as could be seen on a GUI. User interface 110 may be omitted in some implementations.

Processing system 102 includes storage system 104. Processing system 102 retrieves and executes software 106 from storage system 104. In some examples, processing system 102 comprises specialized circuitry, and software 106 or storage system 104 could be included in the specialized circuitry to operate processing system 102 as described herein.

Storage system 104 could include a computer-readable medium such as a disk, tape, integrated circuit, server, or some other memory device, and also may be distributed among multiple memory devices. Software 106 may include an operating system, logs, utilities, drivers, networking software, and other software typically loaded onto a computer system. Software 106 could contain an application program, firmware, or some other form of computer-readable processing instructions. When executed by processing system 102, software 106 directs processing system 102 to operate as described herein, such as prevent receipt of a message until a vehicle is identified as having reached a safe zone.

FIG. 2 illustrates graphical user interface (GUI) 200 displaying an asset tracking map, according to an example. GUI 200 displays the location of vehicles 210 and 212 in real-time on a moving map. GUI 200 may also display information pertaining to vehicles 210 and 212, the operators of vehicles 210 and 212, contacting the operators of the vehicle 210 and 212, and the like. GUI 200 may be displayed locally to the vehicle, remotely to another location, or to both locations simultaneously.

GUI 200 comprises any interface capable of displaying vehicle information in real-time such as a liquid crystal display, plasma display, and the like.

FIG. 3 illustrates communication between vehicle 210 and communication device 100. FIG. 3 includes vehicle 210, on-board device (OBD) 320, network 310, and communication device 100.

In an example, vehicle 210 comprises pieces of equipment such as mining trucks, airplanes, cars, boats, and the like. Communication device 100 comprises devices capable of transmitting and receiving messages such as a server, a personal computer, a smartphone, a cell phone, a telephone without a GUI, and the like. OBD 110 comprises devices capable of receiving and transmitting messages, and motion and location information such as GPS, smartphones, personal computers, and the like. Network 120 comprises a collection of hardware components interconnected by communication channels that allow sharing of information such as radio networks, satellite networks, internet, and the like.

Figure 4:
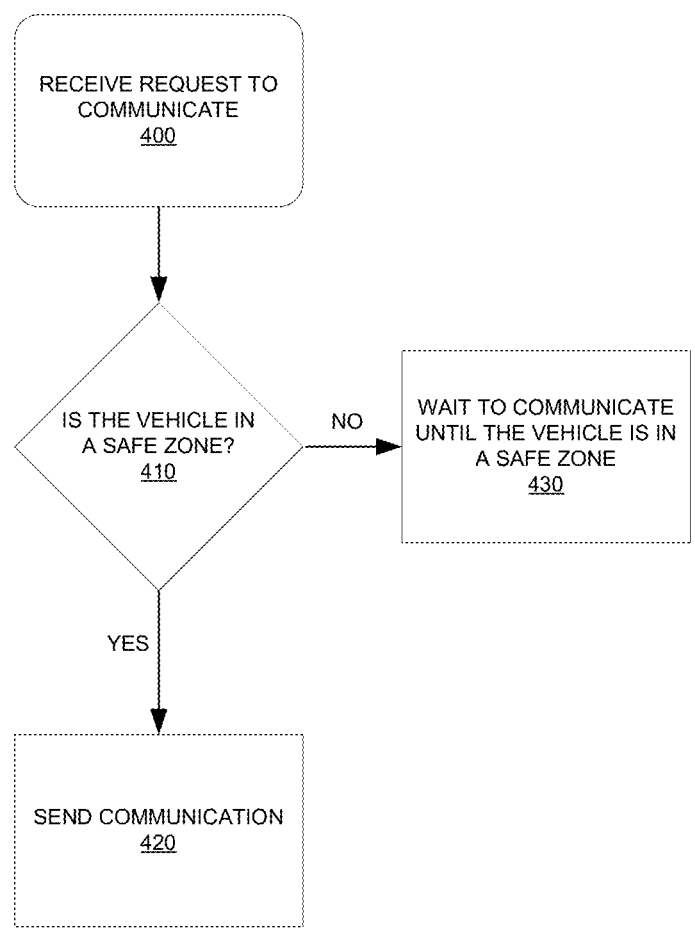
FIG. 4 illustrates an operational flow diagram of an implementation.

FIG. 4 illustrates an operational flow diagram. The steps of the operation are indicated below parenthetically. In an implementation, vehicle 210 is equipped with OBD 320 such that communication device 100 communicates with OBD 320 via network 310.

Communication device 100 is configured to send a request to communicate to OBD 320 (400). The communication request could be a telephone call, a text message, an email, a tweet, or any other communication. Communication device 100 and OBD 320 could be a server, a personal computer, a smartphone, a cell phone, a telephone without a GUI, or any other device or system capable of accomplishing the functionality.

In an example, communication device 100 may be a personal computer and may therefore contain GUI 200 capable of displaying an asset tracking map. In this situation, an asset tracking map may be displayed via communication device's 100 user interface 110 to assist in placing a communication to OBD 320 (400).

In requesting the communication to OBD 320 (400), an asset tracking map is displayed via GUI 200 containing information concerning whether the vehicle has reached a safe zone, the vehicle's estimated time of arrival (ETA), the vehicle's current location, and/or other information. As shown in FIG. 2, the asset tracking map allows for viewing of the location of vehicles 210 and 212 in real-time on a moving map.

In one example, placing the cursor of the mouse on an icon representing a vehicle provides information about the vehicle. For instance, placing the cursor over the icon representing vehicle 210 provides information including operator of vehicle 210, ETA of vehicle 210, destination of vehicle 210, speed of vehicle 210, and so forth. Other information that may be provided could include the current location of the vehicle, the driving history of the operator of the vehicle, and so forth.

The communication to OBD 320 (400) may be placed via GUI 200. In placing the cursor over the icon representing vehicle 210, the option of the type of call to place may be presented. In FIG. 2, GUI 200 displays the options of "call", "text", and "email". Other options could include the option to place an emergency call to OBD 320, which would override the requirement that the vehicle be in a safe zone.

In another implementation, communication device 100 may be a telephone without a GUI. In this case the communication requested (400) will lack the GUI display shown in FIGS. 1 and 2. Therefore the corresponding information displayed by a GUI may be unavailable or it may be ascertained through interaction with the telephone.

Once the communication has been requested (400), a determination is made concerning whether vehicle 210 and/or 212 is in a safe zone (410). The determination can be made by communication device 100, network 310, OBD 320, or a combination of thereof. The safe zone may be defined as follows: the vehicle quits moving, the vehicle arrives at a specific location, the vehicle speed falls below a threshold, the vehicle is within a predefined area, or other criteria. The motion of the vehicle may be reported via OBD 320.

If vehicle 210 and or 212 is in a safe zone, then the communication is allowed to occur, and sent to OBD 320 (420). In one implementation, a manager calls the operator of company vehicle 210 using GUI 200 on communication device 100 which could be a personal computer. In this instance the safe zone could be defined as when vehicle 210 stops moving. By using GUI 200, the manager can see that vehicle 210 has stopped moving, if speed is displayed as 0 mph and the icon representing vehicle 210 changed from red to green indicating vehicle 210 is in a safe zone. The manager will then choose the "call" option displayed on GUI 200 and be connected to OBD 320, which in this instance could be a cell phone.

If vehicle 210 and/or 212 is not in a safe zone, then the communication is placed in a queue and the call must wait until vehicle 210 and/or 212 is in a safe zone (430). In one implementation, a manager calls the operator of company vehicle 210 using GUI 200.

Communication device 100 containing GUI 200, here a personal computer or cell phone, determines whether vehicle 210 is in a safe zone. In this example, the safe zone could be defined as when vehicle 210 reaches its destination.

By using GUI 200, the manager can see that vehicle 210 has not reached its destination and the icon representing vehicle 210 remains red indicating vehicle 210 is not in a safe zone. The manager may wish to wait to contact the operator of vehicle 210 until a later time based on the ETA displayed by GUI 200 or may wish to contact the operator via OBD 320 and wait on the line until vehicle 210 is in a safe zone. If the manager decides to contact the operator, she will then choose the "call" option displayed on GUI 200 and be placed on hold until vehicle 210 arrives in a safe zone.

In another implementation, the manager may be allowed to override waiting until vehicle 210 arrives in a safe zone by indicating that the call is an emergency. In this situation the manager will be immediately connected with OBD 320 regardless of whether the vehicle is in a safe zone.

In addition to allowing communication device 100 connect to OBD 320 via a telephone call, communication may be established through text messaging, or any other communication method, in which a brief written message can be exchanged between communication device 100 and OBD 320 via network 310. Communication may also be established through email in which digital messages can be exchanged between communication device 100 and OBD 320 via network 310. Another mode of communication includes tweeting, in which text-based posts of up to 140 characters, known as "tweets," are exchanged between communication device 100 and OBD 320 via network 310. Additionally, any other mode of exchanging information may also be used.

Figure 5:
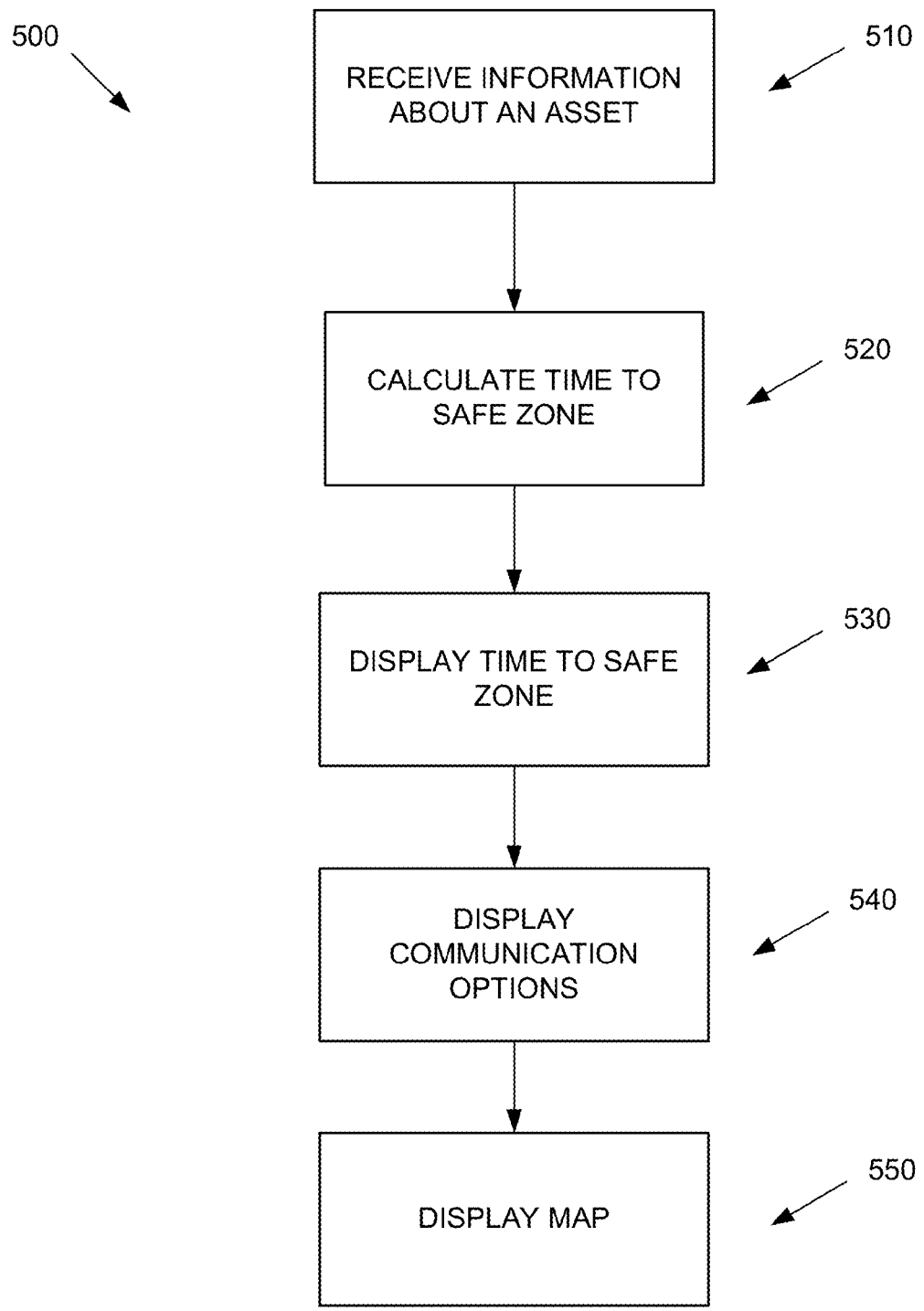
FIG. 5 illustrates an operational flow diagram of an implementation.

FIG. 5 illustrates an operational flow diagram of an example method 500 of operation. The steps of the operation are indicated below parenthetically. In an implementation, vehicles 210 and 212 are equipped with OBD 320 such that communication device 100 communicates with OBD 320 via network 310 to other OBDs and vehicles.

Communication device 100 may be capable of receiving information about an asset (510). In this example the asset is vehicle 210. The information may include GPS position, speed, communication options available, and other information. The information may be received via OBD 320 via network 310 from vehicle 210 and/or other OBDs and vehicles.

OBD 320, communication device 100, or other device may calculate time for vehicle 210 to reach a safe zone (520). The calculated time may be then displayed (530) by communication device 100 and/or OBD 320.

Communication device 100 may also be optionally capable of displaying communication options (540) received in the information about the asset. Furthermore, communication device 100 may be capable of displaying a near real-time map (550). In this example, the map includes the location and communication options of vehicle 210, as well as a red or green indicator indicating if vehicle 210 is in a safe zone. The map may also include an estimated time to a safe zone, if vehicle 210 is not in a safe zone.

In an example, communication device 100 may be a personal computer and may therefore contain GUI 200 capable of displaying an asset tracking map (550). In this situation, an asset tracking map may be displayed via communication device's 100 user interface 110.

Asset tracking map is displayed via GUI 200 containing information concerning whether the vehicle has reached a safe zone, the vehicle's estimated time of arrival (ETA), the vehicle's current location, and/or other information. As shown in FIG. 2, the asset tracking map allows for viewing of the location of vehicles 210 and 212 in real-time on a moving map.

In one example, placing the cursor of the mouse on an icon representing a vehicle provides information about the vehicle. For instance, placing the cursor over the icon representing vehicle 210 provides information including operator of vehicle 210, ETA of vehicle 210, destination of vehicle 210, speed of vehicle 210, communication options of the vehicle, and other information. Other information that may be provided could include the current location of the vehicle, the driving history of the operator of the vehicle, and various other information.

It should be noted that the disclosure is in no way limited to the discussed implementations. The applicability of the present disclosure extends to many fields including aviation, construction, mining, trucking, and so forth. For instance, airline pilots operating an airplane may be prevented from receiving a call until the airplane has stopped moving.

FIGS. 1-5 and the previous descriptions depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for displaying information relating to communication with an asset, comprising:
    receiving information at a computing device relating to the asset, the information comprising asset location, speed, and communication options;
    calculating an estimated time for the asset to reach a safe zone, based at least in part on the received information;
    delaying communication with the asset when the asset is not in the safe zone; and
    displaying, by the computing device, the communication options of the asset;
    wherein the safe zone is determined by the computing device at least in part using: the asset stops, the asset arrives at a specific location, an asset speed falls below a threshold, and the asset is within a predefined area;
    wherein the communication options comprise at least one of a text, email, and voice communication.

2. The method of claim 1, wherein the calculating is based at least in part upon the distance between the asset and the safe zone.

3. The method of claim 1, wherein the information relating to the asset is received from at least one of an on board device and a communication device, wherein the on board device or the communication device is associated with the asset.

4. The method of claim 3, wherein the computing device comprises a personal communication device.

5. The method of claim 1, further comprising requesting to communicate with the asset, and communicating with the asset when the asset is in the safe zone.

6. The method of claim 5, wherein the communication with the asset is based at least in part on the received information relating to the asset.

7. The method of claim 1, further comprising presenting a map incorporating the asset location, and estimated time required for the asset to reach the safe zone.

8. The method of claim 1, wherein the asset comprises a vehicle.

9. A non-transitory computer readable medium having stored thereon program instructions executable by a computing device that, when executed by the computing device, direct the computing device to:
    receive information at the computing device relating to an asset, the information comprising asset location, and the communication options;
    display, by the computing device, a map incorporating the asset location, and the communication options of the asset;
    requesting communication with the asset via at least one of the received communication options;
    communicating with the asset when the asset is in a safe zone; and
    delaying communication with the asset when the asset is not in the safe zone,
    wherein the safe zone is determined by the computing device at least in part using: the asset stops, the asset arrives at a specific location, an asset speed falls below a threshold, and the asset is within a predefined area;
    wherein the communication options comprise at least one of a text, email, and voice communication.

10. The non-transitory computer readable medium of claim 9, further comprising instructions to calculate an estimated time for the asset to arrive at the safe zone, based at least in part on the received information relating to the asset.

11. The non-transitory computer readable medium of claim 9, wherein the information relating to the asset is received from an on board device or a personal communication device.

12. The non-transitory computer readable medium of claim 9, wherein the computing device comprises a mobile communication device.

13. The non-transitory computer readable medium of claim 9, further comprising instructions to display whether or not the asset is in the safe zone.

14. A non-transitory computer readable medium having stored thereon program instructions executable by a computing device that, when executed by the computing device, direct the computing device to:
 receive information at the computing device relating to an asset, the information comprising asset location, speed, and communication options;
 calculate an estimated time for the asset to reach a safe zone, based at least in part on the received information;
 determine whether or not the asset is in the safe zone;
 communicate with the asset when the asset is in the safe zone, and delay communication with the asset when the asset is not in the safe zone; and
 display, by the computing device, a map incorporating the asset location, time required for the asset to reach the safe zone, communication options of the asset, and whether or not the asset is in the safe zone,
 wherein the safe zone is determined by the computing device at least in part using: the asset stops, the asset arrives at a specific location, an asset speed falls below a threshold, and the asset is within a predefined area;
 wherein the communication options comprise at least one of a text, email, and voice communication.

15. The non-transitory computer readable medium of claim 14, wherein the computing device comprises a personal communication device.

16. The non-transitory computer readable medium of claim 14, wherein the information relating to the asset is received from an on board device or personal communication device associated with the asset.

17. The non-transitory computer readable medium of claim 14, comprising further instructions to request to communicate with the asset.

* * * * *